United States Patent [19]

Hart

[11] 4,012,125

[45] Mar. 15, 1977

[54] NONDISTORTING MIRRORS WITH SPECIFIED ANGULAR MAGNIFICATION OR DEMAGNIFICATION

[76] Inventor: Philip J. Hart, 843 Ross Court, Palo Alto, Calif. 94303

[22] Filed: Jan. 7, 1975

[21] Appl. No.: 539,050

[52] U.S. Cl. .............................. 350/296; 350/293; 350/303

[51] Int. Cl.² .......................................... G02B 5/10

[58] Field of Search ......................... 350/293–296, 350/303, 304, 288, 200, 55, 27

[56] References Cited

UNITED STATES PATENTS

| | | | |
|---|---|---|---|
| 1,552,451 | 9/1925 | Roach | 350/299 |
| 3,203,328 | 8/1965 | Brueggemann | 350/200 |
| 3,337,660 | 8/1967 | Bagby | 350/293 |

*Primary Examiner*—John K. Corbin
*Assistant Examiner*—Jon W. Henry

[57] ABSTRACT

Non-distorting mirrors are disclosed that are each curved in at least one plane and positioned relative to an observer in accordance with a mathematical relation by which the observer is presented with a virtual image of a selected field of view of the surroundings, the virtual image having a specified angular magnification or demagnification without angular distortion in the aforementioned plane. Such a mirror may be designed to have a value of angular demagnification for which a wide field of view of the surroundings is compressed within the narrower angular limits of the mirror relative to the observer and may be employed as a rear- or side-view mirror for an automobile, aircraft, or other vehicle. This mirror may be employed in addition to or in combination with a conventional plane rear- or side-view mirror.

28 Claims, 12 Drawing Figures

TYPE B MIRROR

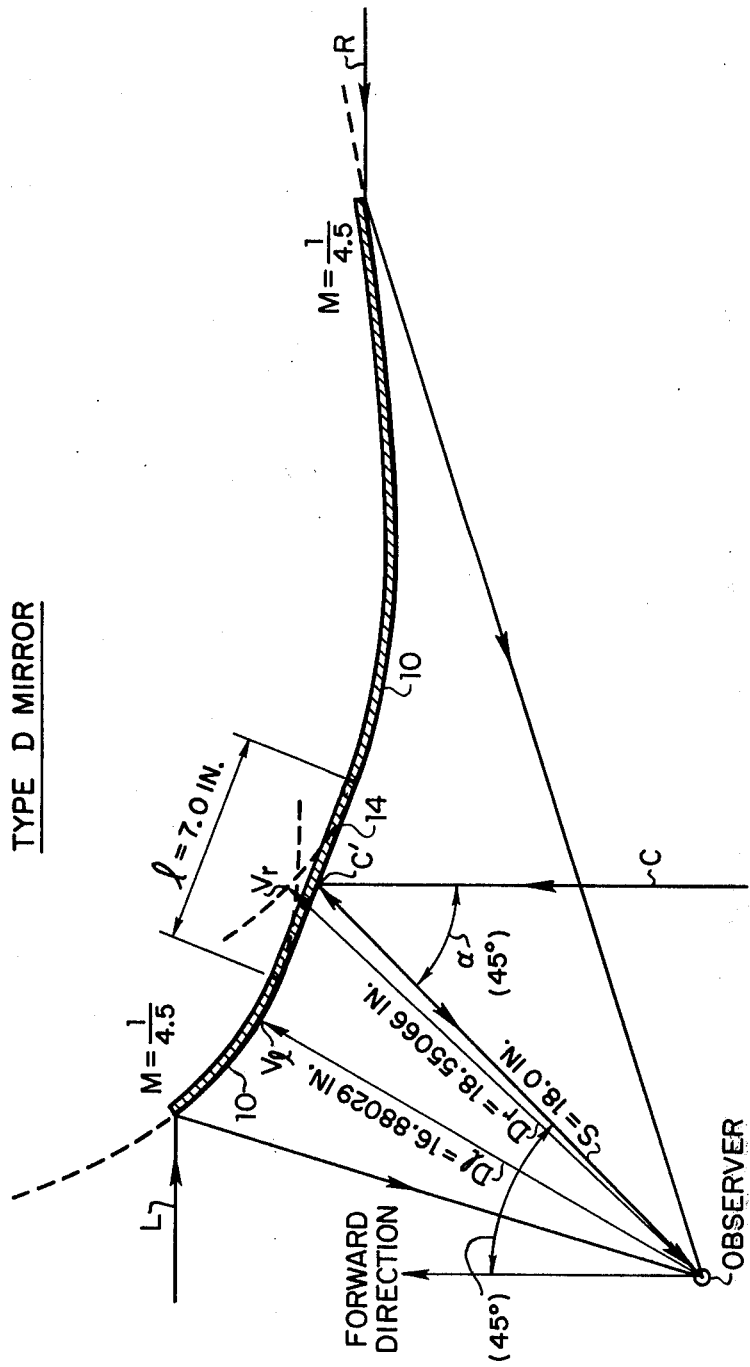

NONDISTORTING MIRRORS WITH SPECIFIED ANGULAR MAGNIFICATION OR DEMAGNIFICATION

BACKGROUND OF THE INVENTION

This invention relates generally to mirrors curved in at least one plane to produce a virtual image having a specified angular magnification or demagnification with no angular distortion in the aforementioned plane and more particularly to such mirrors for use in vehicles.

The need and responsibility which a driver or navigator of a vehicle has for being aware of objects such as other vehicles in his surroundings are obvious. Various techniques, such as the use of rear-view mirrors for ground vehicles or the use of radar for aircraft and ships, have been devised to display or present an image of surrounding objects. Many of these techniques suffer from deficiencies such as gaps or distortions in the presentation of the image. For example, the conventional plane or flat rear-view mirror commonly used in automobiles does not adequately show objects to the side. The use of several mirrors, such as a rear-view mirror and two side-view mirrors, to remedy this shortcoming necessitates the dangerous procedure of looking from one mirror to another, often through a wide angle and often still with gaps in the view of the surroundings presented by the mirrors.

Spherical or other curved mirrors currently used present a wider but angularly distorted view of the surroundings. This angular distortion occurs whether the curved mirrors are used alone or are superposed on or used as "wings" (i.e., as adjoining end sections) for flat mirrors. Due to this angular distortion, the observer is provided with an inaccurate and unreliable representation of the spatial relationships between his or her vehicle and surrounding objects. Reliance on such an angularly distorted view of the surroundings could therefore be unsafe.

Even radar may not show the presence of very close objects as tragically witnessed by the crash of two airplanes approaching the same runway, one above the other, at the same time and in broad daylight at Moffett Field, Mountain View, California on Apr. 12, 1973. An appropriate mirror system with no angular distortion could have timely and accurately apprised the navigators of these airplanes of the danger.

SUMMARY OF THE INVENTION

The principal object of this invention is to provide improved mirrors for presenting an observer with a virtual image of a selected portion of the surroundings, the virtual image having any desired finite positive angular magnification or demagnification without angular distortion in at least one plane (these mirrors being herein referred to as non-distorting mirrors).

Another object of this invention is to provide non-distorting mirrors having any desired positive angular demagnification for compressing a wide field of view within the narrower angular limits of the mirrors relative to an observer.

Still another object of this invention is to provide non-distorting mirrors that may be employed as rear- or side-view mirrors for automobiles, aircraft, or other vehicles and that may be employed in addition to or in combination with conventional plane rear- or side-view mirrors.

These and other objects are accomplished according to the illustrated preferred embodiments of this invention by providing a non-distorting mirror curved in at least one plane containing an axis of symmetry of the non-distorting mirror and positioned relative to an observer in accordance with the following mathematical relation, here expressed in polar coordinates:

$$r = \frac{D}{\left(\cos\frac{1+M}{2M}\theta\right)^{2M/(1+M)}},$$

where $r$ is the radius vector and extends from the observer, who is located at a reference position, which in this case is the origin of the polar coordinates, to a given point being considered on the surface of the non-distorting mirror and lying in the aforementioned plane D is the distance from the observer to the vertex of the non-distorting mirror and is a constant (the vertex is the point on the non-distorting mirror where the axis of symmetry of the non-distorting mirror intersects the surface of the non-distorting mirror and is also the point on the non-distorting mirror from which a ray of light passing through the origin of the polar coordinates is reflected back on itself); $\theta$ (the vectorial angle) is the angle subtended by the portion of the virtual image (of the surroundings, where the word surroundings as used herein refers to all objects that may be viewed from the position of the non-distorting mirror) visible in the non-distorting mirror between the angular limits set by the vertex and the given point being considered on the surface of the non-distorting mirror as measured from the position of (or viewed by) the observer, and M is a constant for each non-distorting mirror and is the angular magnification (or demagnification) representing how many times the angle $\theta$ is larger (or smaller) than the angle subtended by the portion of the surroundings lying between the angular limits set by the vertex and the given point being considered on the surface of the non-distorting mirror as measured from the point where the axis of symmetry of the non-distorting mirror intersects the projection (through the surface of the non-distorting mirror) of the ray of light from the surroundings that is incident at the given point being considered on the surface of the non-distorting mirror and that is reflected to the observer at the origin of the polar coordinates (the portion of the surroundings lying between the last-mentioned angular limits is also referred to herein as an object). If the virtual image viewed in the non-distorting mirror is considered to be the virtual image of a distant object (commonly understood to be any object sufficiently distant that light rays emanating from any given point on the object are substantially parallel at the positions of the observer and the mirror), the angular magnification may be taken as the ratio of the angle $\theta$ and the angle subtended by the distant object as viewed from any position adjacent to the non-distorting mirror. In order to simplify the description, the word angular magnification is also hereinafter used as a generic term for both angular magnification (finite values of M greater than one) and angular demagnification (positive values of M less than one).

As hereinafter described in greater detail, such non-distorting mirrors can be used in a great variety of applications. For example, they may be employed as rear- or side-view mirrors for automobiles, may be mounted at locations inside or outside the automobiles, and may be used either alone or in combination with conventional plane mirrors. According to one of the preferred embodiments of this invention, such a non-distorting mirror having a value of angular magnification M less than one is mounted directly above, directly below, or otherwise in close proximity to the conventional plane rear-view mirror normally mounted at the central front portion of an automobile. According to another of the preferred embodiments of this invention, two such non-distorting mirrors having either a two- or a three-dimensional curvature and a value of angular magnification M less than one are attached as "wings" to the conventional plane rear-view mirror. For any given positioning of the observer and the plane rear-view mirror, non-distorting mirrors having a two-dimensional curvature and the desired value of angular magnification M can be devised to meet the plane rear-view mirror tangentially and thus to present no gap in the image of the surroundings as the image passes from one section of the composite mirror to the other. Such combinations of non-distorting and plane mirrors may also be employed as side-view mirrors for an automobile and may be mounted inside or outside the automobile. Non-distorting mirrors may be similarly employed on an aircraft, a watercraft, or other such vehicle to show the surroundings at the sides, above, below, and to the rear of the vehicle.

DESCRIPTION OF THE DRAWINGS

FIG. 11 is a cross-sectional view of a type D composite mirror comprising two non-distorting mirrors curved in accordance with the mathematical relation of FIG. 1 and attached as wings to the ends of a conventional plane mirror.

DESCRIPTION OF THE PREFERRED EMBODIMENTS

Figure 1:
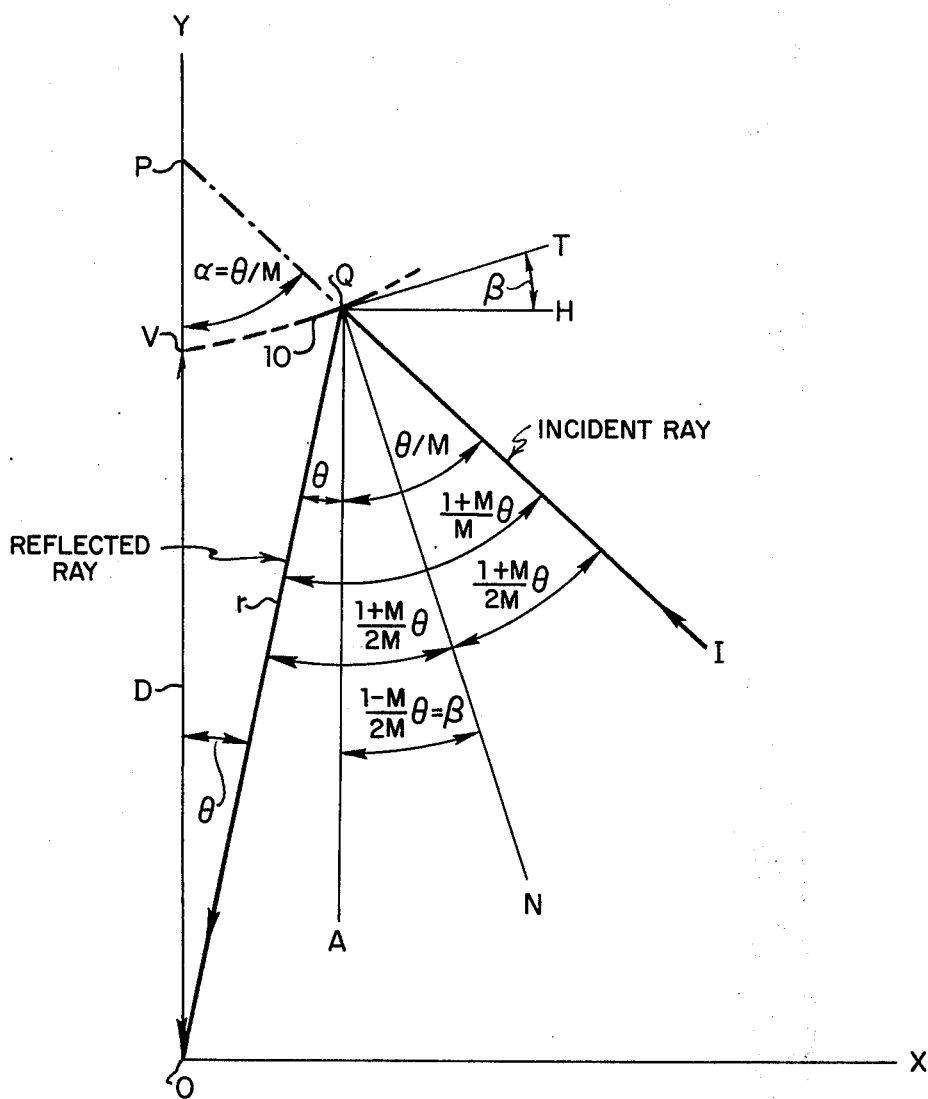
FIG. 1 is a diagram employed in the derivation of the indicated mathematical relation for defining the shape of non-distorting mirrors according to the preferred embodiments of this invention.

Referring to FIG. 1, there is shown a diagram employed in the derivation of a differential equation the solution of which gives the indicated mathematical relation for defining the shape of non-distorting mirrors according to the preferred embodiments of this invention. All lines in this diagram lie in the same plane defined by the coordinate X and Y axes, and the derivation will be carried out for this XY plane. Let the observer be located at the origin O of the coordinate X and Y axes which are chosen such that the Y axis is an axis of symmetry passing through the vertex V of, in this case a convexly-curved (as viewed by the observer) non-distorting mirror 10 and such that a ray of light OV from the origin O will be reflected from the vertex V back on itself to the origin O. Consider now the portion of the virtual image of the surroundings which the observer sees between the limits defined by the angle VOQ (hereinafter referred to as the angle $\theta$), where Q is the point being considered on the surface of the non-distorting mirror 10 from which an incident ray of light IQ is reflected along line QO to the observer at the origin O. Let line QT be tangent to the surface of the non-distorting mirror 10 at point Q, line QH be parallel to the X axis, line QA be parallel to the Y axis, and line QN be perpendicular to the surface of the non-distorting mirror 10 at point Q. The angle $\beta$ between lines QT and QH determines the slope of the surface of the non-distorting mirror 10 at point 10 relative to the X axis through the mathematical relation $dy/dx = \tan\beta$ and is to be determined for the non-distorting condition.

Now let the incident ray of light IQ be extended back through the non-distorting mirror 10 so as to intersect the Y axis at point P. It is evident that with the non-distorting mirror 10 removed an observer at point P would see the portion of the surroundings being considered through angle IPO (hereinafter referred to as the angle $\alpha$). The angular magnification M of virtual image of the portion of the surroundings being considered is defined as the ratio of the angle $\theta$ to the angle $\alpha$, that is, $M = \theta/\alpha$. In other words, the angular magnification M represents how many times the angle subtended by the virtual image is larger (or smaller) than the angle subtended by the portion of the surroundings being considered. As indicated in FIG. 1, it therefore follows that $$\alpha = \theta/M \qquad (1)$$

Note that the angular magnification M, as defined, can be greater or less than one. When the angular magnification M is less than one, it represents a demagnification or decrease in angular size of the virtual image compared to the angle subtended by the portion of the surroundings being considered (the condition usually desired for rear-view mirrors). In fact, as FIG. 1 is drawn, the angular magnification M is approximately equal to one-fourth so that the virtual image would appear to be about one-fourth the angular size of the portion of the surroundings being considered. However, certain optical instruments may require the angular magnification M to be greater than one, thereby representing an increase in angular size. In this latter case the surfaces of the non-distorting mirror 10 in FIG. 1 would be concave relative to the origin O.

The angle $\beta$ can now be determined readily from the theorems of plane geometry. Angle OQA = POQ = $\theta$ (alternate interior angles), and angle AQI = angle OPQ = $\alpha$ = $\theta/M$ (sides parallel). Thus, angle OQI between the incident and the reflected rays, being the sum of $\theta$ and $\theta/M$, is equal to $(1+M)\theta/M$. Since the angles of incidence and reflection are equal, it follows that angle NQI = angle NQO = $(1+M)\theta/2M$. Thus, angle AQN = $[(1+M)\theta/2M] - \theta$. Since this angle is equal to the angle $\beta$ (sides mutually perpendicular), the angle $\beta$ is given by $$\beta = \frac{1-M}{2M}\theta \qquad (2)$$

As mentioned above, the slope of the surface of the non-distorting mirror 10 is given by the mathematical relation $dy/dx = \tan\beta$. By substitution of the expression for $\beta$ given in equation (2) into this relation, the differential equation for the slope of the surface of the non-distorting mirror 10 is then given by $$\frac{dy}{dx} = \tan\frac{1-M}{2M}\theta \qquad (3)$$

The requirement that the surface of the non-distorting mirror 10 produce no angular distortion of the image is satisfied if the angular magnification M is a constant for any and all pairs of incident and reflected rays of light, the angular magnification M then being constant across the whole field of view in the XY plane. Thus, with the angular magnification M fixed at some arbitrary positive constant, equation (3) represents the differential equation for the slope of the surface of the non-distorting mirror 10. However, equation (3) is expressed in mixed rectangular and polar coordinates. Equation (3) may be expressed entirely in rectangular coordinates as follows:

$$\frac{dy}{dx} = \tan\left(\frac{1-M}{2M}\tan^{-1}\frac{x}{y}\right) \qquad (4)$$

In this form it is rather difficult to solve and is therefore preferably expressed entirely in polar coordinates as follows:

$$\frac{dr}{r} = \tan\frac{1+M}{2M}\theta d\theta, \qquad (5)$$

where $r$ is the radius vector OQ from the origin O to the point Q being considered on the surface of the non-distorting mirror 10. The solution of equation (5) gives the following mathematical relation for defining the cross-sectional shape of the surface of the non-distorting mirror 10 in the XY (or $r\theta$ plane) (i.e., for defining the surface of a mirror presenting the observer with a virtual image of a portion of the surroundings without angular distortion in the aforementioned plane):

$$r = \frac{D}{\left(\cos\frac{1+M}{2M}\theta\right)^{2M/(1+M)}}, \qquad (6)$$

where D is the distance OV from the observer to the vertex of the non-distorting mirror 10.

Figure 2:
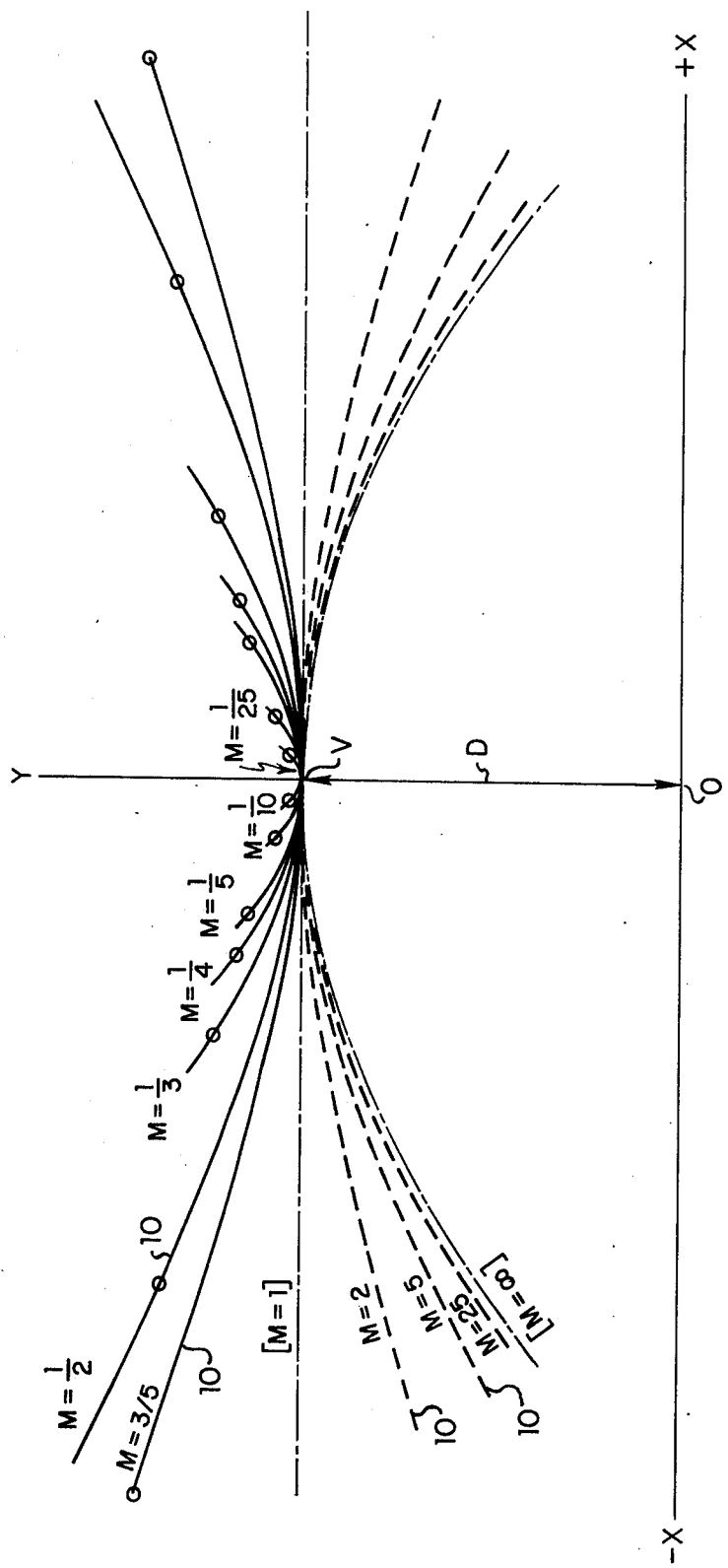
FIG. 2 is a plot of a family of curves generated in accordance with the mathematical relation of FIG. 1 for a fixed value of D, each curve representing the cross section of a non-distorting mirror with the specified value of M.

With the distance D fixed, equation (6) defines a family of curves, examples of which are plotted in FIG. 2. Each plotted curve represents the cross section in the aforementioned plane of a non-distorting mirror 10 with the specified value of angular magnification M. Non-distorting mirrors 10 for which the angular size of the virtual image as seen from point O (the origin) in FIG. 1 is larger than the angular size of the object as seen from point P in FIG. 1 (i.e., those mirrors having finite values of angular magnification M greater than one) are indicated by dashed lines in FIG. 2. The reducing or demagnifying non-distorting mirrors 10 (i.e., those mirrors having positive values of angular magnification M less than one) are plotted as solid lines in FIG. 2. All of the curved non-distorting mirrors 10 having positive values of angular magnification M less than one, or greater than one and less than infinity, may have important applications within the scope of this invention. However, the non-distorting mirrors of greatest interest in accordance with the preferred embodiments of this invention are those having positive values of angular magnification M less than one. The circled points on each of the latter mirrors represented in FIG. 2 and in subsequent figures show the positions at which rays of light approaching the Y axis perpendicularly from the right or the left are reflected from each of those mirrors (assuming the other mirrors are not present) toward the observer at point O. In other words, from point O the observer sees a virtual image of a 180° angle of view of the surroundings on his side of each of those mirrors (including his own image) in the portion of each of those mirrors lying between the circled points. Obviously, other angles of view of the surroundings greater or less than 180° can be viewed by the observer from point O and could have been marked by circled points. However, the illustrated angle of view of 180° makes a convenient reference.

The widest possible angle of view $\alpha_{max}'$ (where $\alpha' = 2\alpha$) of the surroundings that can be viewed by an observer from point O with a non-distorting mirror 10 having a given angular magnification M is easily found. From equation (6) it is seen that when the quantity $(1+M)\theta/2M$ approaches 90°, the distance r becomes very large. This determines the asymptotic angle $\theta_{max}$, the widest possible angle $\theta_{max}'$ (where $\theta' = 2\theta$) subtended by the non-distorting mirror 10, and, hence, the widest possible angle of the virtual image presented by the non-distorting mirror to the observer at point O. With the aid of FIG. 3, the widest possible angle $\theta_{max}'$ subtended by the non-distorting mirror 10 as measured from point O may be expressed as a function of the angular magnification M by the following equation:

$$M = \frac{1}{2} \cdot \frac{1}{\sqrt{2}} \sqrt{y^3 + y^2 \sqrt{x^2 + y^2}} - \frac{1}{\sqrt{2}} \sqrt{x^2 \sqrt{x^2 + y^2} - x^2 y}$$

$$\theta_{max}' = 360° \, M/(1+M) \qquad 7.$$

The widest possible angle of view $\alpha_{max}'$ of the surroundings that can be viewed in the non-distorting mirror 10 by an observer from point O therefore includes all the surroundings except that portion included between the asymptotes and, in this case, blocked out by the non-distorting mirror itself. Thus, $\alpha_{max}' = 360° - \theta_{max}'$. Substitution of $\theta_{max}'$ from equation (7) into this relation gives:

$$\alpha_{max}' = 360/(1+M) \qquad 8.$$

Figure 3:
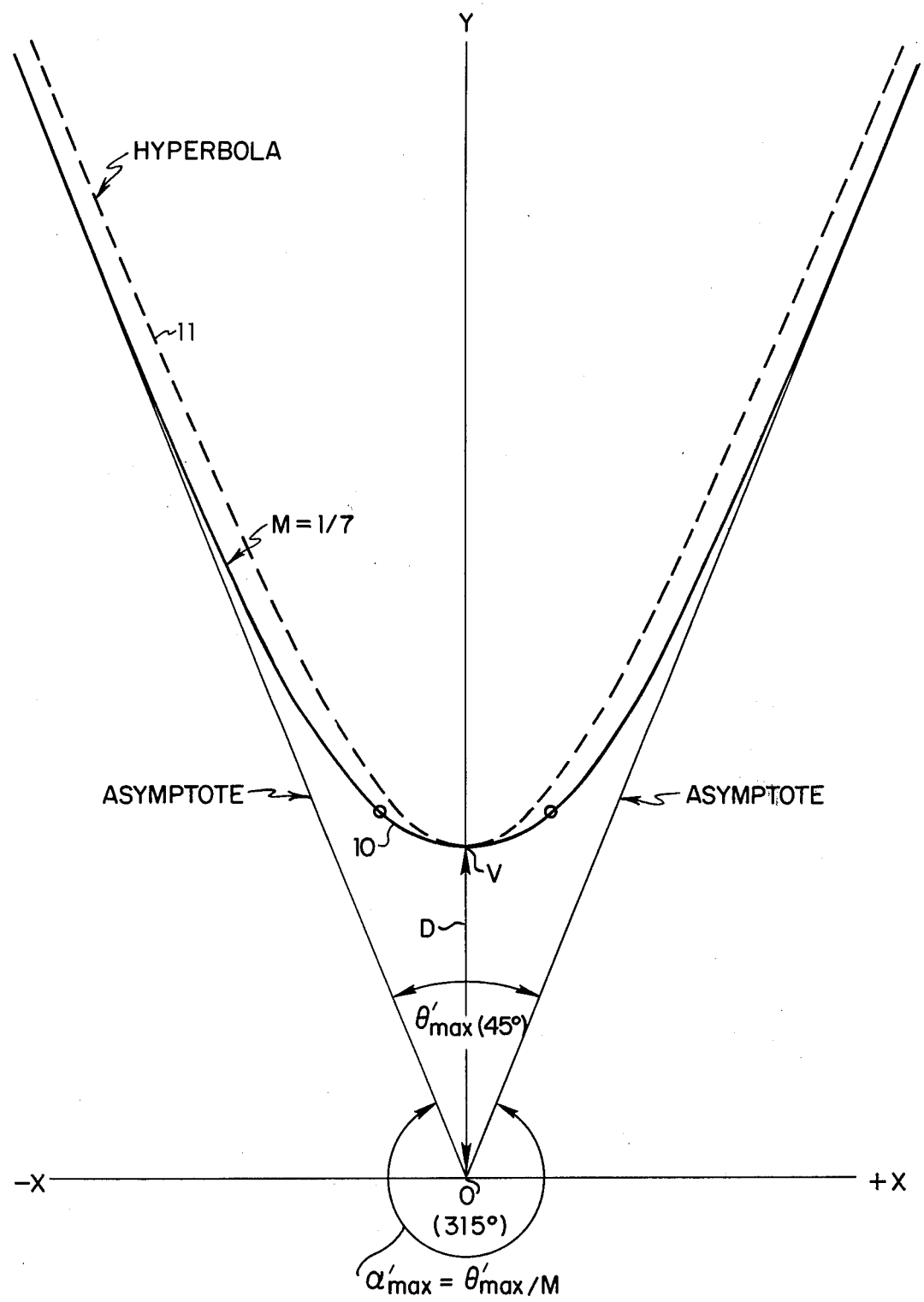
FIG. 3 is a diagram illustrating the widest angle of view of the surroundings that may be obtained from a non-distorting mirror represented in cross section by a curve (solid line) generated in accordance with the mathematical relation of FIG. 1 for a given value of M equal to one-seventh. This diagram also compares that curve with the corresponding hyperbola (dashed line) having the same vertex and asymptotes.

In the limiting case being considered, it should be noted that as incident rays of light emanating from distant locations along the sides of the non-distorting mirror 10 approach coincidence with the asymptotes, point P in FIG. 1 moves towards and approaches coincidence with point O in FIG. 3. Hence, for distant objects the determination of equation (8) for $\alpha_{max}'$ is the same whether taken with reference to point P in FIG. 1 or point O in FIG. 3.

The angles $\alpha_{max}'$ and $\theta_{max}'$ and the asymptotes are shown in FIG. 3 for the case of a non-distorting mirror 10 having a value of angular magnification M of 1/7 (in that case $\theta_{max}' = 45°$ and $\alpha_{max}' = 315°$). Note that as the value of angular magnification M increases, the widest possible angle of view $\alpha_{max}'$ of the surroundings that can be viewed as a virtual image in the non-distorting mirror 10 by an observer from point O decreases and that for values of angular magnification M greater than one $\alpha_{max}'$ is less than 180° (i.e., non-distorting mirrors 10 having values of angular magnification M greater than one cannot present a virtual image of a 180° angle of view of the surroundings). This accounts for the lack of circled points on those non-distorting mirrors 10 having values of angular magnification M greater than one in FIG. 2. However, because the size of a non-distorting mirror 10 increases rapidly as the asymptotes are approached and because a large angle of view of the surroundings may not be desired, the largest practical or desirable angle subtended by a non-distorting mirror 10 may be considerably smaller than $\theta_{max}'$. It should be noted that each curve defined by equation (6) above may also have additional lobes although only one lobe is considered here.

Although hyperbolas also have similar vertices and asymptotes, the curves generated in accordance with equation (6) to represent the non-distorting mirrors 10 are not hyperbolas except for the case where the angular magnification M equals 1/3. This is evident when the equations for defining the curves representing the non-distorting mirrors 10 and for defining the corresponding hyperbolas are written in rectangular coordinates as illustrated by the examples given below. In each example the first equation defines a curve representing a non-distorting mirror 10 having the indicated value of angular magnification M and the second equation defines the corresponding hyperbola having the same vertex and asymptotes (the equations defining the hyperbolas, of course, always being of second degree in $x$ and $y$).

Figure 4:
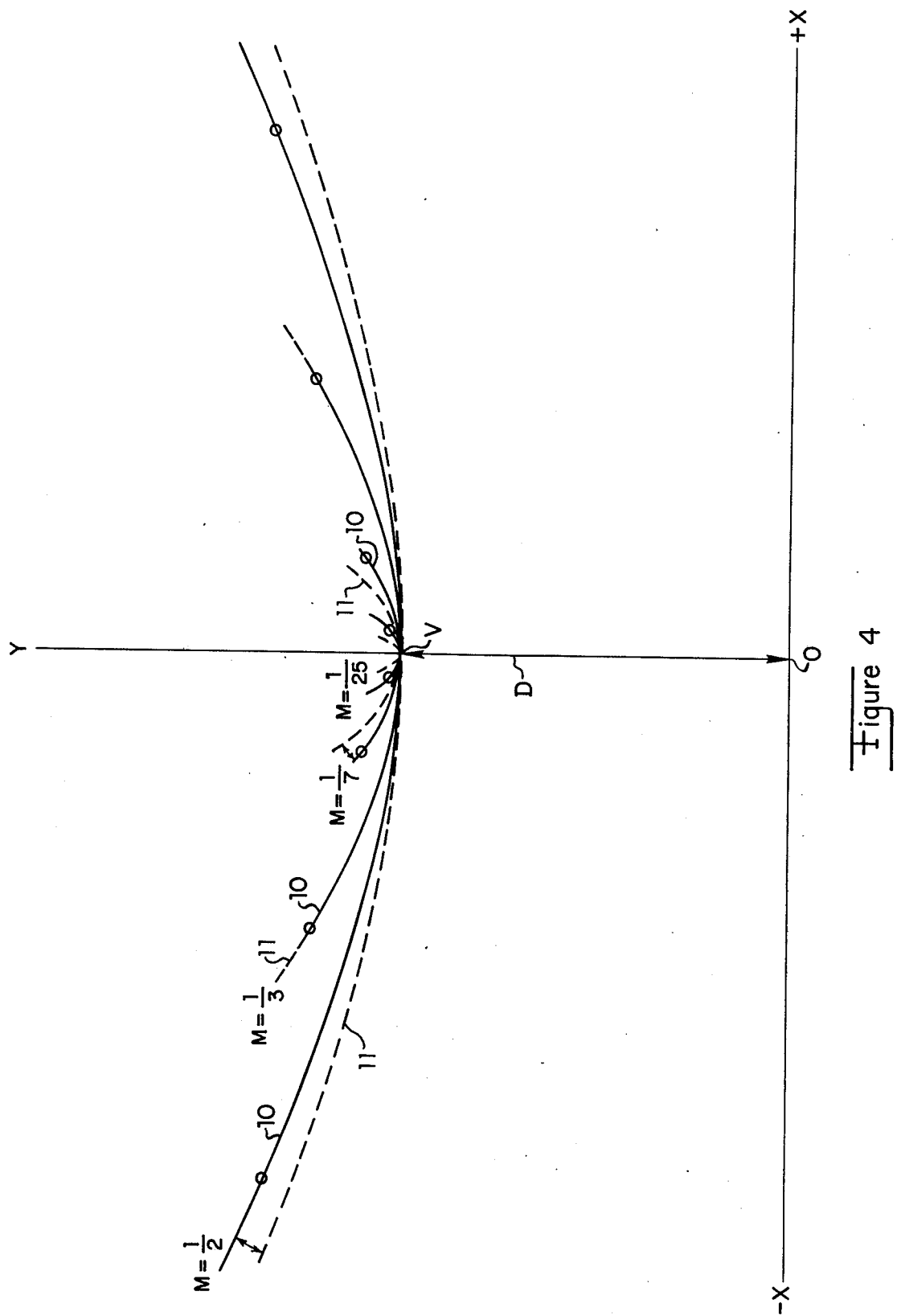
FIG. 4 is a plot of a family of curves (solid lines) generated in accordance with the mathematical relation of FIG. 1 for a fixed value of D and of the corresponding hyperbolas (dashed lines) having the same vertex and asymptotes.

$-D^{3/2} = 0; \; y^2 - (1/3) \, x^2 - D^2 = 0$ $M = 1/3: \; y^2 - x^2 - D^2 = 0; \; y^2 - x^2 - D^2 = 0$ $M = 1/5: \; y^3 - 3x^2 y - D^3 = 0; \; y^2 - 3x^2 - D^2 = 0$ $M = 1/7: \; y^4 - 6x^2 y^2 + x^4 - D^4 = 0; \; y^2 - (3 + 2\sqrt{2}) \, x^2 - D^2 = 0$ $M = 1/9: \; y^5 - 10x^2 y^3 + 5x^4 y - D^5 = 0; \; y^2 - (5 + 2\sqrt{5}) \, x^2 - D^2 = 0$ $M = 1/11: \; y^6 - 15x^2 y^4 + 15 \, x^4 y^2 - x^6 - D^6 = 0; \; y^2 - (7 + 4\sqrt{3}) \, x^2 - D^2 = 0$ In FIGS. 3 and 4 a number of curves are plotted in accordance with equation (6) to represent cross sections of different non-distorting mirrors 10 (solid lines) and are compared with the corresponding hyperbolas 11 (dashed lines) having the same vertex and asymptotes. As indicated above and best illustrated in FIG. 4, the non-distorting mirrors 10 differ considerably from their corresponding hyperbolas 11 on both sides of the hyperbolic non-distorting mirror having a value of angular magnification M of 1/3. The non-hyperbolic non-distorting mirrors 10 diverge in opposite directions from their corresponding hyperbolas 11 on either side of the hyperbolic non-distorting mirror. Differences between the non-hyperbolic non-distorting mirrors 10 and the corresponding hyperbolas 11 are also evident when their curvatures are compared as illustrated by the examples given below. In each example, the value of angular magnification M of a non-distorting mirror 10 is first given followed by the radius of curvature at the vertex of the non-distorting mirror 10 and then by the radius of curvature at the vertex of the corresponding hyperbola 11.

$M = 2/3$: 4D compared to 9.472D;
$M = 1/2$: 2D compared to 3D;
$M = 1/3$: D compared to D (the same);
$M = 1/4$: (2/3)D compared to 0.52786D;
$M = 1/5$: (1/2)D compared to (1/3)D;
$M = 1/7$: (1/3)D compared to 0.17157D;
$M = 1/25$: 0.08333D compared to 0.014743D.

Although the non-distorting mirror 10 for the case where the angular magnification M equals 1/3 turns out to be a special case hyperbola (known as a rectangular hyperbola) occurring in a family of hyperbolic curves, it also falls into the family of curves defined by equation (6) and may therefore be used to produce a uniform angular magnification of 1/3 when the mirror is properly positioned with respect to point O.

Figure 5A:
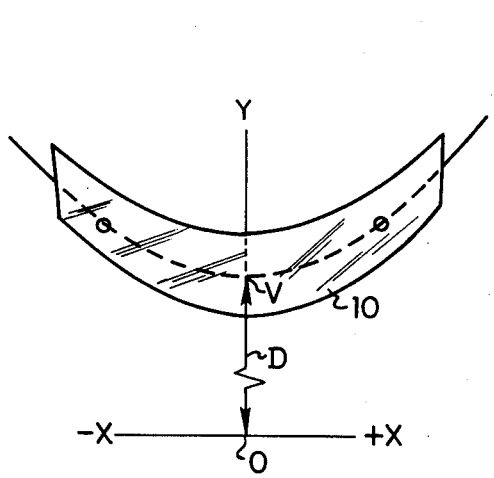
FIG. 5A is a perspective view of a non-distorting mirror having a two-dimensional curvature in accordance with the mathematical relation of FIG. 1 in the XY plane.
Figure 5B:
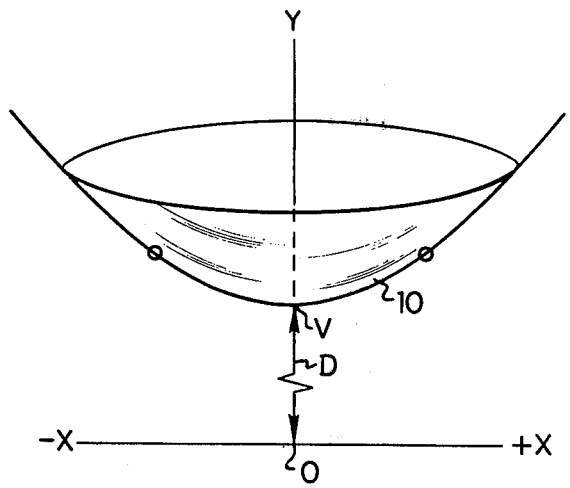
FIG. 5B is a perspective view of a non-distorting mirror having a three-dimensional curvature in accordance with the mathematical relation of FIG. 1 in any plane containing the axis of symmetry.

The non-distorting mirrors 10 can be made with either a two-dimensional (2-D) curvature, producing a cylindrical-like form symmetric about the Y axis and having its longitudinal axis perpendicular to the XY plane (i.e., in the Z direction) as illustrated in FIG. 5A (such mirrors being three dimensional, but having curvature in only two dimensions) or with a three-dimensional (3-D) curvature, producing a form symmetric about an axis of revolution coincident with the Y axis as illustrated in FIG. 5B.

As shown in FIGS. 5A and 5B for the respective 2-D and 3-D non-distorting mirror forms, the observer position O, the axis of symmetry OY, and the vertex V all lie in the XY plane for which the mirror cross section is a curve defined by equation (6). Thus, the 2-D mirror form of FIG. 5A is generated by the translation of this curve in a direction perpendicular to the XY plane while the 3-D mirror form of FIG. 5B is generated by a rotation of this curve about the OY axis.

Each of the 2-D and 3-D forms has its own properties and applications. The 2-D form is non-distorting in the sense that the angular magnification (expansion or reduction) is constant for given planes. Although the angle subtended by the virtual image of the surroundings in a direction perpendicular to the XY plane (i.e., the angle as measured in the YZ plane from point O) is unchanged from that of a plane mirror in the case of the 2-D form, the angle subtended by the virtual image of the surroundings measured in the XY plane is uniformly compressed or expanded and the angular magnification M of the virtual image as measured in the XY plane has a finite positive value of less or greater than one. (When the angle subtended by the virtual image of a portion of the surroundings is measured in a plane containing the axis of symmetry OY and lying between the XY and YZ planes, the angular magnification has a constant value between the value of M for the XY plane and one. However, in this case, the angle subtended by the last-mentioned virtual image and the angle subtended by the last-mentioned portion of the surroundings do not lie in the same plane.) An object in the surroundings can still be recognized in the virtual image presented by a mirror of 2-D form if the value of the angular magnification M of the virtual image as measured in the XY plane is not too different from one. The 2-D form has the advantage that the vertical angular size of the virtual image is the same as that of the object. This property may be useful to help an observer estimate the actual distance to the object. Another advantage of the 2-D form is that such mirror sections can be readily joined tangentially to a conventional plane mirror section so that there is no discontinuity as the virtual image passes from one mirror section to the other.

On the other hand 3-D form produces a virtual image that is undistorted over the whole field of view (i.e., the angular magnification is the same in the horizontal and vertical directions and all orientations therebetween). In order for both the 2-D and 3-D forms to present a virtual image with uniform angular magnification M across the field of view, the Y axis passing through the vertex of the non-distorting mirror 10 must be aimed toward the observer and the vertex of the non-distorting mirror must be located the correct distance D from the observer.

Figure 6:
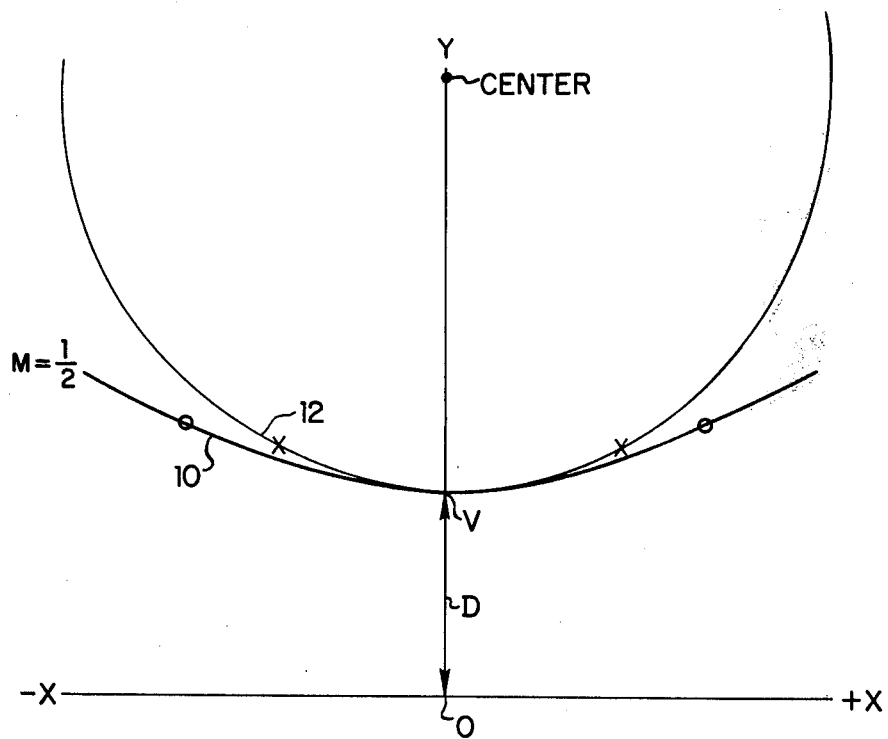
FIG. 6 is a cross-sectional comparison of a non-distorting mirror curved in accordance with the mathematical relation of FIG. 1 for a value of M equal to one-half and of a conventional spherical mirror, both of which have the same radius of curvature at the vertex of the non-distorting mirror.

In FIG. 6 cross sections of a non-distorting mirror 10 having a value of angular magnification M equal to ½ and of a spherical mirror 12 having the same radius of curvature as the non-distorting mirror at the vertex of the non-distorting mirror are shown superposed and tangent to one another at the vertex of the non-distorting mirror. As mentioned above, the circled points on the non-distorting mirror 10 represent the end points between which an observer at point O can see a virtual image of a 180° angle of view of the surroundings. The starred points on the spherical mirror 12 represent the corresponding end points for the spherical mirror. Since both mirrors have the same curvature and angular magnification at the vertex of the non-distorting mirror 10, it is evident that the virtual image of the surroundings provided by the spherical mirror 12 will be considerably compressed in the outer portions of the spherical mirror and therefore distorted compared to the non-distorted virtual image of the surroundings provided by the non-distorting mirror.

The design of a non-distorting mirror 10 for a specific purpose depends on such factors as the allowable distance D from the observer to the mirror, on the angular magnification M desired or allowed by the available space, on the size and positioning of the mirror so as to obtain the desired angle of view, and on any desired combination with other mirrors. Certain preferred types of non-distorting mirrors 10 (namely, types A through D) are described below in terms of positioning or combinational form. Although these non-distorting mirrors are described as if used for rear- or side-view mirrors on automobiles, they can be used in many other applications.

Type A

As illustrated in cross section in FIG. 7, a type A non-distorting mirror 10 is mounted directly in front of the observer (or driver) and of necessity must be positioned above or below the observer's forward view through the front windshield of the automobile on which the mirror is mounted. The non-distorting mirror 10 can be of the 2-D form or the 3-D form shown in FIGS. 5A and 5B, respectively (and in the latter case may comprise a band or sectional strip of the 3-D form taken horizontally thereacross). Advantages of the type A non-distorting mirror 10 are that that the observer does not have to shift his or her view greatly from the forward direction to look into the mirror; the observer can view a reduced image of all the surroundings to the rear; and the mirror has a minimum size or extent (distance across the mirror) in keeping with the magnification and angle of view desired. A disadvantage of this type of non-distorting mirror 10, when the observer is the driver, is that since the mirror is not mounted on the center line of the automobile, the view through the rear window is not straight down the road behind the automobile.

Figure 7:
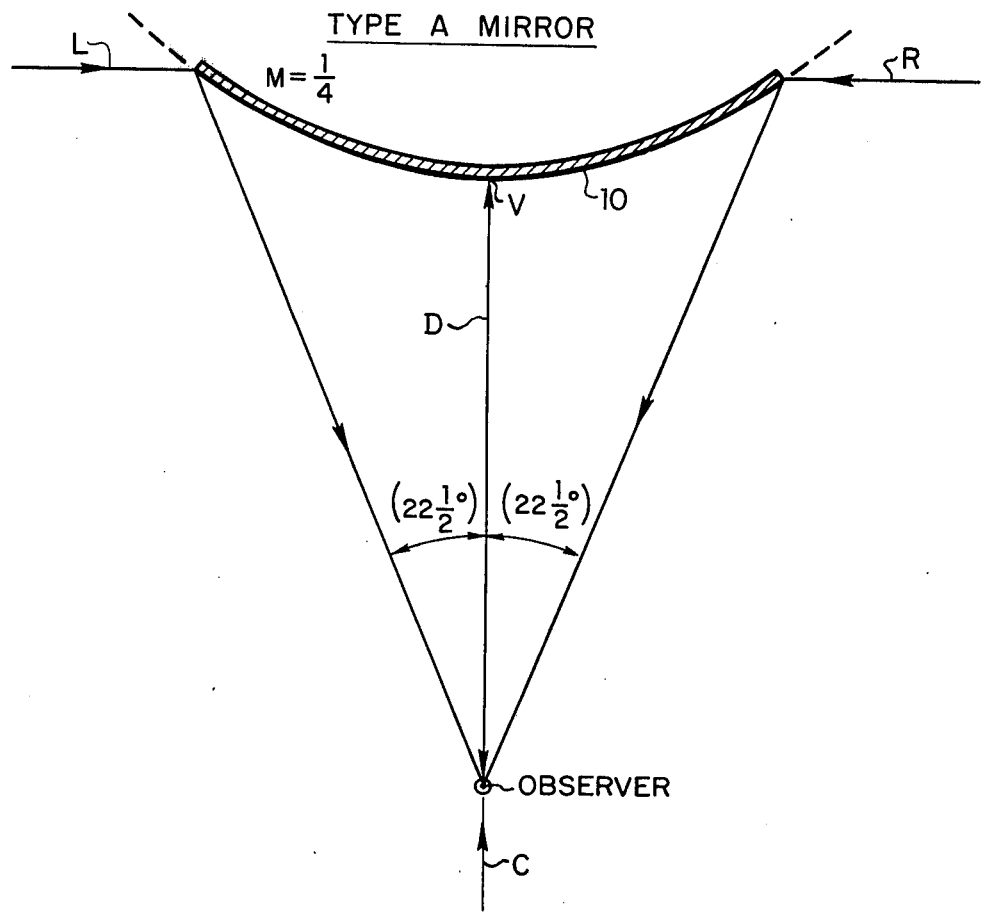
FIG. 7 is a cross-sectional view of a type A non-distorting mirror curved in accordance with the mathematical relation of FIG. 1 and mounted directly in front of the observer.

For the case of a type A non-distorting mirror 10 having a value of M = ¼, as illustrated in FIG. 7, the angle through which the observer sees a virtual image of a 180° angle of view of his or her surroundings to the rear and sides is given by $180M = 180(¼) = 45°$ and is bisected by the reflected center ray C. This angle is decreased or increased for smaller or larger values of M, respectively, as indicated by the following examples: for M = ⅓, 60°; for M = 1/5, 36°; for M = 1/6, 30°; for M = 1/7, 25 5/7°; for M = ⅛, 22 ½°; for M = 1/9, 20°; and for M = 1/10, 18°. Thus, the physical size of mirror needed is determined by the distance D, by the angular magnification M, and by the external angle of view desired.

Type B

Figure 8:
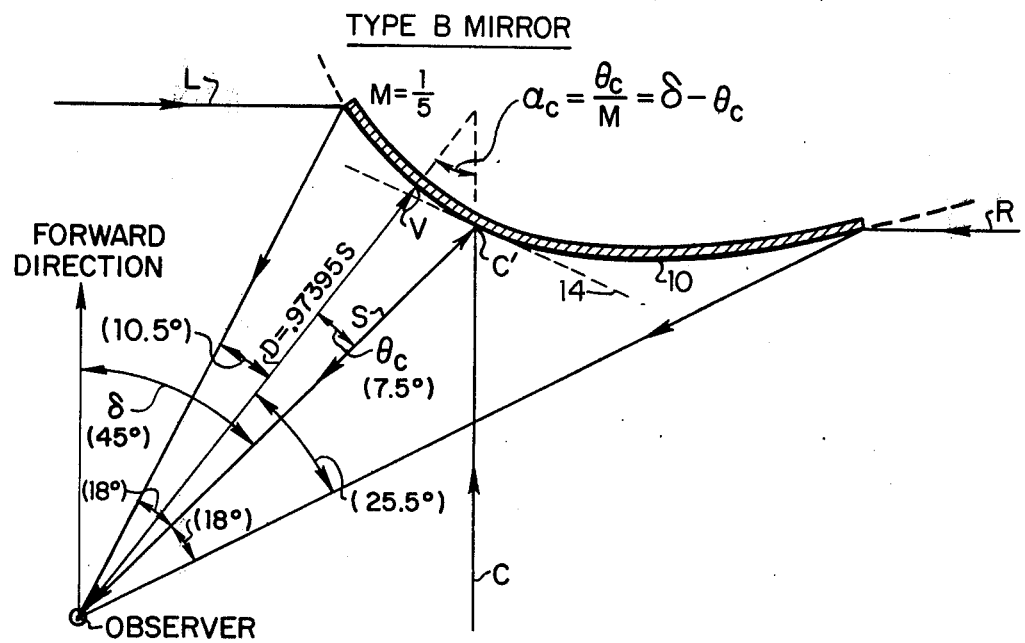
FIG. 8 is a cross-sectional view of a type B non-distorting mirror curved in accordance with the mathematical relation of FIG. 1 and mounted ahead and to one side of the observer.

As illustrated in cross section in FIG. 8, a type B non-distorting mirror 10 is mounted ahead and to the side of the observer or driver (i.e., at a non-zero angle relative to the forward direction from the observer). An obvious position is on the center line of the automobile above or below the observer's forward view through the front windshield of the automobile. The non-distorting mirror 10 can be of the 2-D form or the 3D form shown in FIGS. 5A and 5B, respectively. As shown in FIG. 8 for the case of a type B non-distorting mirror 10 having a value of M = 1/5, the axis of symmetry OV of the non-distorting mirror must be aimed, as always, straight toward the observer. However, it should be noted that for a type B non-distorting mirror 10 the vertex is not coincident with the point C' from which the center ray C through the rear window of the automobile is reflected to the observer. It can be easily shown that the angle $\theta_c$ between the vertex V and the point C' relative to the observer is given by the following relation:

$$\theta_c = M\delta/(1 + M), \qquad 9.$$

where $\delta$ is the angle by which the reflected center ray C from point C' to the observer is displaced from the forward direction relative to the observer. The relation between the magnification M and the angle (bisected by the reflected center ray C) through which the observer views a virtual image of 180° of the surroundings to the rear and sides is the same for the type B non-distorting mirror 10 as for the type A non-distorting mirror. As indicated in FIG. 8, the incoming rays R and L from 90° to the right and the left, respectively, of the forward direction are not exactly in line. However, this is of little consequence for distant objects.

The calculated values of the angle $\theta_c$, of the angle (bisected by the reflected center ray C) through which the observer sees a virtual image of a 180° angle of view of the surroundings to the rear and sides, of other angles, and of the distance D between the observer and the vertex V of the non-distorting mirror 10 (the distance D being expressed in terms of the distance S between the observer and the point C') are shown in FIG. 8 for the given value of angular magnification M equal to 1/5 and an assumed value of the angle $\delta$ equal to 45°. It is evident that to obtain the same angular view to the right as to the left of the center line CC' a considerably longer portion of the non-distorting mirror 10 must be employed to the right than to the left of the vertex V of the non-distorting mirror (or vice versa if the observer is positioned on the right side of the automobile as would typically be the case when the steering wheel is positioned on the right side of the automobile). This is a disadvantage of the type B non-distorting mirror 10. An obvious advantage of this type of non-distorting mirror 10 is that the view straight down the road behind the automobile is centered in the angular view provided for the observer in the mirror.

Figure 9:
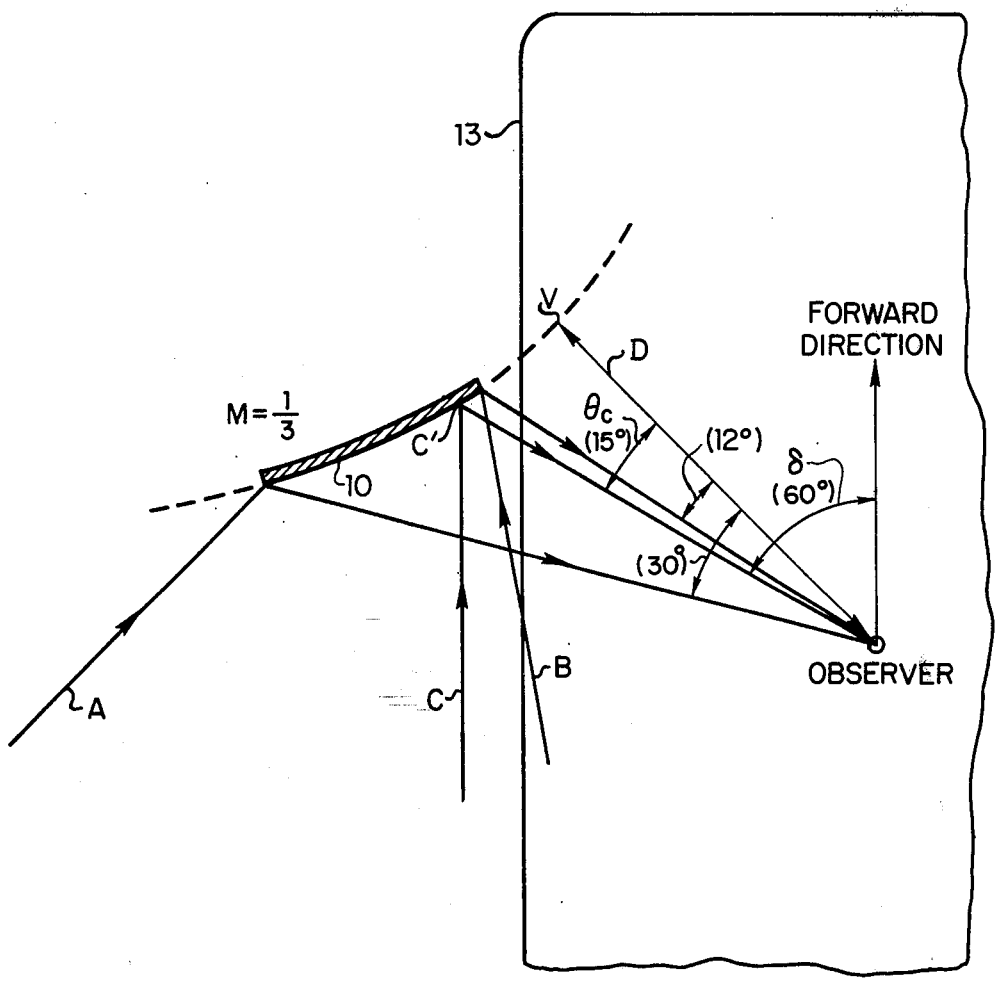
FIG. 9 is a cross-sectional view of a type B non-distorting mirror curved in accordance with the mathematical relation of FIG. 1 and mounted as a side-view mirror on a vehicle.

A cross section of a type B non-distorting mirror 10 mounted at the side of an automobile 13 is shown in FIG. 9. The design principles are the same as for the above-described type B non-distorting mirror 10. However, in this case the vertex V of the non-distorting mirror 10 may not lie on the portion of the mirror being used (i.e., may not lie on the actual mirror itself). For a given value of angular magnification M equal to ⅓ and an assumed value of the angle $\delta$ equal to 60°, the calculated value of the angle $\theta_c$ is 15° as indicated in FIG. 9. The limiting rays A and B reflected from the left and right ends of the non-distorting mirror 10 are taken to be at 30° and 12°, respectively, from a line (the axis of symmetry) passing through the vertex V of the mirror and the reference position occupied by the observer as also indicated in FIG. 9. It should be noted that for illustrated non-distorting mirror 10, the angle of view between the limiting rays A and B incident on the left and right ends of the mirror is 54°, not 180° as in the previous cases.

Type C

A type C mirror comprises the combination of a type B non-distorting mirror 10 fixedly or adjustably mounted immediately above or below a plane mirror 14. This combination is one of the most important embodiments of the present invention. The non-distorting mirror 10 of this combination can be of the 2-D form shown in FIG. 5A, but preferably comprises a section of the 3-D form shown in FIG. 5B (the section being a band or a sectional strip taken horizontally across the 3-D form). In one of the preferred arrangements, this combination is mounted on the center line of an automobile and positioned at the front of the automobile above or below the observer's forward view through the front windshield so that the point C' at which the center ray C from the rear window is reflected from one of the mirrors lies directly above or below the corresponding point C' of the other of the mirrors. Such an arrangement is illustrated in FIG. 8 by the type B non-distorting mirror 10 shown in solid lines and the plane mirror 14 shown as a dashed line. The value of the angular magnification M of the type B non-distorting mirror 10 may be selected so that the non-distorting image-reducing mirror has a convenient length.

Figure 10:
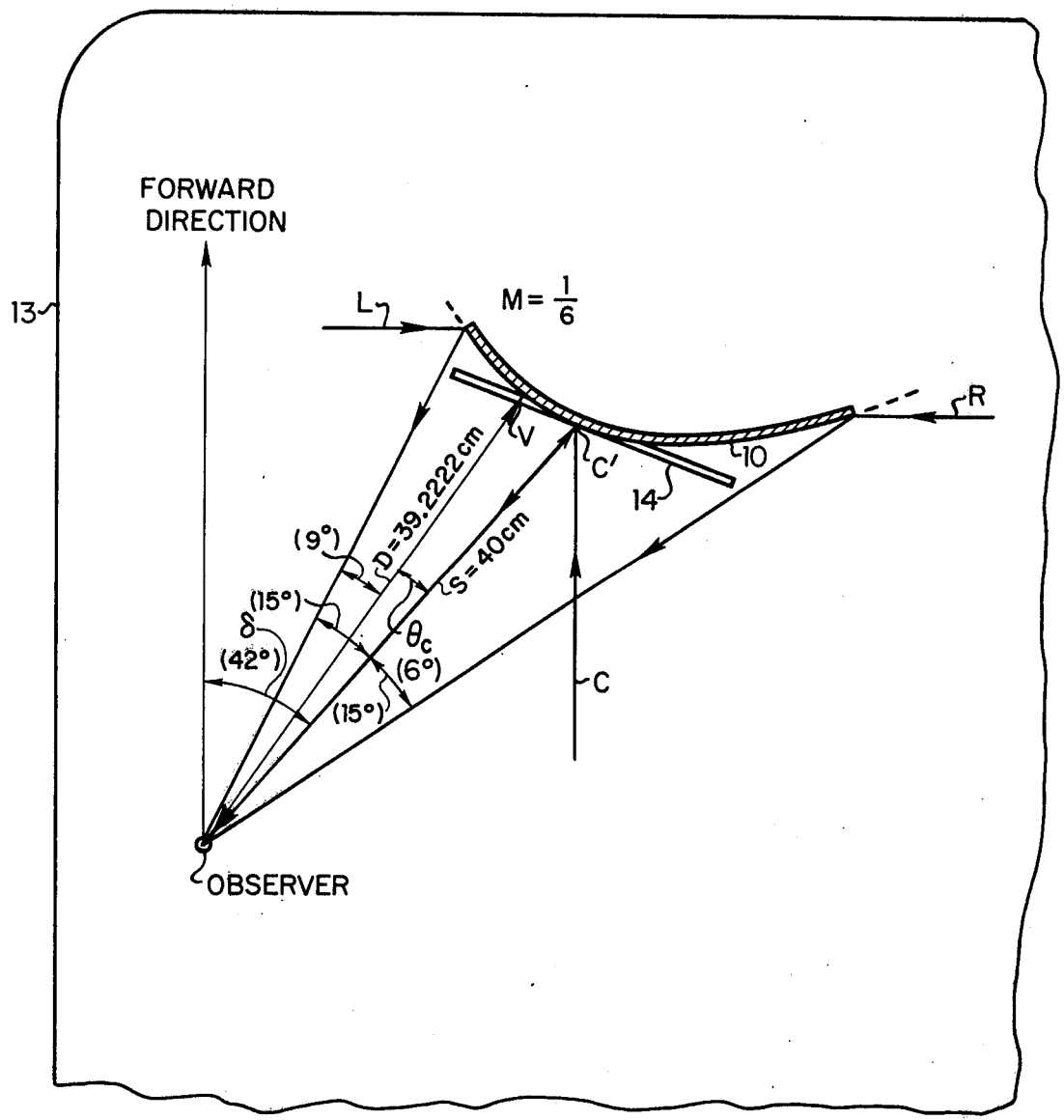
FIG. 10 is a cross-sectional view of a type C composite mirror comprising a conventional plane mirror mounted in a vehicle and a non-distorting mirror curved in accordance with the mathematical relation of FIG. 1 and also mounted in the vehicle directly above the conventional plane mirror.

An example of how a type C composite mirror may be designed for a given purpose is illustrated in FIG. 10 where the reflection of the center ray C by the plane mirror 14 is known to lie at a displacement angle $\gamma$ of 42° from the forward direction relative to the observer, the distance S from the observer to the point C' on the plane mirror 14 is known to be 40 cm, and the length $l$ of the plane mirror 14 is known to be 23 cm. From this information the angle subtended by the plane mirror 14 as viewed by the observer is found to be 29.75°. If it is desired that the non-distorting mirror 10 subtend approximately the same angle and provide a 180° angle of view of the surroundings behind and to the sides of the observer, a non-distorting mirror having a value of angular magnification M equal to 1/6 can be used. As indicated in FIG. 10, the angle subtended by the non-distorting mirror 10 is then 30° (very nearly equal to the angle subtended by the plane mirror 14), the angle $\theta_c$ between the vertex V of the non-distorting mirror and the point C' (the point at which the center ray C is reflected from the non-distorting mirror 10) relative to the observer is 6°, and the distance D between the observer and the vertex of the non-distorting mirror 10 is 39.222 cm. However, to aid in recognition of the image presented by the non-distorting image-reducing mirror 10, it may well prove desirable to make the non-distorting mirror somewhat longer than the plane mirror and, perhaps, to draw a vertical line through the point C' on the non-distorting mirror.

A type C composite mirror provides the observer, for example, the driver of a vehicle such as an automobile with a virtual image in the plane mirror 14 of all objects he or she can view through the rear window of the automobile and with an adjacent undistorted virtual image of reduced size in the non-distorting mirror 10 of all the surroundings behind and to the sides (including all objects he or she can view through the rear window) of the automobile that are not obscured by the structure of the automobile itself. Since one of the adjacent images is positioned directly above the other, the driver does not have to look around and search through a wide angle to observe them. The relative orientation of the non-distorting and plane mirrors 10 and 14 can be preset so that adjustment of the type C composite mirror to accommodate the driver's position need involve only the usual adjustment for the view provided in the plane mirror 14. With appropriate design and adjustments, type C composite mirrors 14 can also be made for mounting at other positions such as at the sides of automobiles, trucks, aircraft, watercraft, or other vehicles for use as side-view mirrors.

Type D

A type D mirror comprises the combination of a plane mirror section 14 with a pair of adjoining non-distorting mirror-sections 10 fixedly mounted as wings at the opposite ends of the plane mirror section. In one of the preferred arrangements of this combination illustrated in FIG. 11, the mirror sections 10 are of the 2-D form shown in FIG. 5A and are attached tangentially as wings to the right and left ends of the plane mirror section 14. The calculated design dimensions for a 180° angle of view of the surroundings behind and to the sides of the observer, an assumed value of angular magnification M of 2/9, an assumed distance S of 18 in. between the observer and the point C' at which the center ray C is reflected from the plane mirror section 14, a plane mirror section having a length of 7 in., and an assumed angle δ of 45° between the forward direction and the reflected center ray C relative to the observer are indicated in FIG. 11 although other assumed values of M, S, $l$, and δ can be used equally well. It should be noted that the distance $D_r$ between the observer and the vertex $V_r$ of the right non-distorting mirror section 10 is different from the distance $D_l$ between the observer and the vertex $V_l$ of the left non-distorting mirror section 10.

When the type D composite mirror of FIG. 11 is mounted on the center line of an automobile and the plane mirror section 14 is positioned the same as an ordinary plane rear-view mirror, the observer is provided with a full-size undistorted image in the plane mirror section 14 of his or her view straight back through the rear window of the automobile and with an image of reduced size, but undistorted in the horizontal plane, in each of the adjoining right and left non-distorting mirror sections 10 of his or her view through the right and left windows, respectively, of the automobile. Since the non-distorting mirror sections 10 meet the plane mirror section 14 tangentially these images are continuous so that no portion of the 180° angle of view of the surroundings behind and to the sides of the observer is omitted from these images except that portion obscured by the structure of the automobile itself. Each of the non-distorting mirror sections 10 can be designed to provide a virtual image uniformly reduced in angular size across its field of view by any predetermined factor (i.e., the image may be highly compressed so that it can all be seen at a glance or more spread out for greater recognizability). An advantage of employing non-distorting mirror sections 10 of the 2-D form is that distances to objects imaged thereby may be more readily estimated since the vertical height of the virtual images therein is unchanged from the vertical height of the virtual image in the plane mirror section 14. However, an obvious disadvantage is the relative change in the horizontal and vertical dimensions of the virtual images in the non-distorting mirror sections 10. This disadvantage can be overcome, although possibly with a certain loss of continuity of the virtual image at the boundaries between the non-distorting and plane mirror sections 10 and 14, by employing a pair of non-distorting mirror sections 10 of the 3-D form each tangentially mounted at at least one point on the adjoining end of the plane mirror section 14.

The non-distorting mirrors 10 of this invention may be manufactured from such materials as glass, plastic, or metal in any of several well-known ways. For mass production the non-distorting mirrors 10 may be cast in a mold having the appropriate shape (any polishing or silvering of the surfaces of the non-distorting mirrors being done by conventional techniques). A master mold may be made with the aid of a computer-controlled cutting machine programmed according to equation (6) above. Simple prototypes of the non-distorting mirrors 10 have been made by plotting equation (6) with the desired values of magnification and distances on graph paper, pasting the graph paper on cardboard, and cutting the cardboard to the shape plotted on the graph paper in accordance with equation (6). Two-dimensional prototypes have been made by attaching a reflecting flexible plastic sheet to the curved front surfaces of two such identical cardboard pieces aligned and rigidly separated by a constant distance. A simple three-dimensional prototype (or mold) can be made by rotating a shaped flat piece about the Y axis in a soft material which thereafter is hardened to fix the shape.

I claim:

1. A mirror having a reflective surface curved in at least one plane in accordance with the following mathematical relation (here expressed in polar coordinates):

$$r = \frac{D}{\left(\cos \frac{1+M}{2M} \theta \right)^{2M/(1+M)}},$$

where the mirror has a vertex and also has an axis of symmetry lying in said plane, passing through the origin of coordinates, intersecting the mirror at the vertex thereof, and intersecting the projection of a light ray that is incident at any given point on the mirror in said plane and that is reflected from the given point to the origin of coordinates; r (the radius vector) extends from the origin of coordinates to the given point on the mirror; D is a fixed distance and extends from the origin of coordinates to the vertex of the mirror; θ (the vectorial angle) is the angle subtended between the vertex of and the given point on the mirror relative to the origin of coordinates; M (the angular magnification) is the ratio of the angle θ to the angle subtended between the vertex of and the given point on the mirror relative to the point of intersection of said axis of symmetry with said projection; and M has a fixed value lying within the limits $0 < M < 1/3$, $1/3 < M < 1$, and $1 < M < \infty$.

2. A mirror having a reflective surface that is curved in at least one plane containing an axis of symmetry of the mirror and that is curved in said plane relative to a reference position on said axis of symmetry in accordance with the following mathematical relation (here expressed in polar coordinates) such that a virtual image of surroundings viewed in the mirror from the reference position has a finite positive angular magnification M:

$$r = \frac{D}{\left(\cos\frac{1+M}{2M}\theta\right)^{2M/(1+M)}},$$

where the reference position is located at the origin of coodinates; the mirror has a vertex; the axis of symmetry passes through the origin of coordinates, intersects the mirror at the vertex thereof, and intersects the projection of a light ray from the surroundings that is incident at any given point on the mirror in said plane and that is reflected from the given point to the reference position; r (the radius vector) extends from the reference position to the given point on the mirror; D is a fixed distance and extends from the reference position to the vertex of the mirror; $\theta$ (the vectorial angle) is the angle subtended relative to the reference position by the portion of said virtual image lying between angular limits set by the vertex of and the given point on the mirror; and M (the angular magnification) is the ratio of the angle $\theta$ to the angle subtended by the portion of the surroundings lying between angular limits set by the vertex of and the given point on the mirror relative to the point of intersection of said axis of symmetry with said projection and has a fixed value lying within the limits $0 < M < \frac{1}{3}$, $\frac{1}{3} < M < 1$, and $1 < M < \infty$ when measured in said plane.

3. A mirror as in claim 2 wherein the reflective surface is concavely curved in said plane relative to the reference position, and the angular magnification M in said plane has a positive value greater than one and less than infinity.

4. A mirror as in claim 2 wherein the reflective surface is convexly curved in said plane relative to the reference position, and the angular magnification M in said plane has a positive value less than one.

5. A mirror as in claim 4 wherein the angular magnification M has a positive value in the range between one-tenth and three-fifths.

6. A mirror as in claim 4 wherein the reflective surface subtends an angle relative to the reference position for providing a reduced virtual image of an angle of view from the mirror of at least one hundred and eighty degrees of the surroundings when the mirror is viewed from the reference position.

7. A mirror as in claim 4 wherein the reflective surface has a three-dimensional shape generated by translation of the portion of the reflective surface that lies in said plane in a direction perpendicular to said plane to provide the reflective surface with curvature in two dimensions.

8. A mirror as in claim 4 wherein the reflective surface has a three-dimensional shape generated by rotation of the portion of the reflective surface that lies in said plane about said axis of symmetry to provide the reflective surface with curvature in three dimensions.

9. A mirror as in claim 4 wherein said axis of symmetry bisects the angle subtended in said plane by the reflective surface relative to the reference position.

10. A mirror as in claim 9 wherein the mirror is mounted on a vehicle directly in front of the reference position and is positioned adjacent to a front windshield of the vehicle for use as a rear-view mirror.

11. A mirror as in claim 10 wherein the reflective surface subtends an angle relative to the reference position for providing a reduced virtual image of an angle of view from the mirror of at least 180° of the surroundings behind and to the sides of the vehicle, insofar as the view of the surroundings is not obstructed by the structure of the vehicle itself, when the mirror is viewed from the reference position.

12. A mirror as in claim 4 wherein said axis of symmetry is angularly offset by a non-zero angle from another axis bisecting the angle subtended in said plane by the reflective surface relative to the reference position.

13. A mirror as in claim 12 wherein the mirror is mounted on a vehicle ahead and to one side of the reference position relative to the forward direction of the vehicle and said non-zero angle ($\theta_c$) is given by the following mathematical relation:

$$\theta_c = m\delta/(1+M),$$

where M is the angular magnification of the mirror in said plane, and $\delta$ is the angle by which said other axis is angularly offset from the forward direction of the vehicle relative to the reference position.

14. A mirror as in claim 13 wherein the mirror is positioned adjacent to a front windshield of the vehicle for use as a rear-view mirror.

15. A mirror as in claim 14 wherein the reflective surface subtends an angle relative to the reference position for providing a reduced virtual image of an angle view from the mirror of at least one hundred and eighty degrees of the surroundings behind and to the sides of the vehicle, insofar as the view of the surroundings is not obstructed by the structure of the vehicle itself, when the mirror is viewed from the reference position.

16. A mirror as in claim 13 wherein the mirror is positioned adjacent to one side of the vehicle for use as a side-view mirror.

17. A combination of mirrors comprising a curved mirror as in claim 4 employed in combination with a plane mirror positioned directly thereabove or therebelow.

18. A combination of mirrors as in claim 17 wherein both mirrors of the combination are fixedly mounted relative to one another, and the combination is adjustably mounted on a vehicle.

19. A combination of mirrors as in claim 17 wherein both mirrors of the combination are mounted on a vehicle ahead and to one side of the reference position relative to the forward direction of the vehicle, said axis of symmetry of the curved mirror is angularly offset by a non-zero angle ($\theta_c$) from another axis bisecting the angle subtended in said plane by the reflective surface of the curved mirror relative to the reference position, and the non-zero angle ($\theta_c$) is given by the following mathematical relation:

$$\theta_c = M\delta/(1+M),$$

where M is the angular magnification of the curved mirror in said plane, and $\delta$ is the angle by which said other axis is angularly offset from the forward direction of the vehicle relative to the reference position.

20. A combination of mirrors as in claim 19 wherein each mirror of the combination subtends substantially the same angle relative to the reference position, and both mirrors of the combination are positioned adjacent to a front windshield of the vehicle for use as rear-view mirrors.

21. A combination of mirrors as in claim 20 wherein the reflective surface of the curved mirror subtends an angle relative to the reference position for providing a reduced virtual image of an angle of view from the mirror of at least one hundred and eighty degrees of the surroundings behind and to the sides of the vehicle, insofar as the view of the surroundings is not obstructed by the structure of the vehicle itself, when the curved mirror is viewed from the reference position.

22. A combination of mirrors as in claim 21 wherein the reflective surface of the curved mirror is curved in three dimensions and is symmetric about an axis of revolution coincident with said axis of symmetry of the curved mirror, both mirrors of the combination are fixedly mounted relative to one another, and the combination is adjustably mounted on the vehicle.

23. A mirror including a plane intermediate section and a pair of curved end sections, each of the curved end sections comprising a curved mirror as in claim 4, having a reflective surface curved relative to the same reference position in accordance with said mathematical relation, and having substantially the same value of angular magnification in said plane when viewed from the reference position.

24. A mirror as in claim 23 wherein an axis bisecting the angle subtended by the entire mirror relative to the reference position and lying in the same plane as the respective axes of symmetry of the curved end sections is offset by a non-zero angle from the axis of symmetry of at least one of the curved end sections.

25. A mirror as in claim 24 wherein the mirror is mounted on a vehicle ahead and to one side of the reference position relative to the forward direction of the vehicle and is positioned adjacent to a front windshield of the vehicle for use as a rear-view mirror.

26. A mirror as in claim 25 wherein the mirror subtends an angle relative to the reference position for providing a reduced virtual image of an angle of view from the mirror of at least one hundred and eighty degrees of the surroundings behind and to the sides of the vehicle, insofar as the view of the surroundings is not obstructed by the structure of the vehicle itself, when the mirror is viewed from the reference position.

27. A mirror as in claim 26 wherein each of the curved end sections of the mirror is curved in two dimensions and is tangentially disposed at every point along an adjoining end of the plane intermediate section.

28. A mirror as in claim 26 wherein each of the curved end sections of the mirror is curved in three dimensions and is tangentially disposed at at least one point along an adjoining end of the plane intermediate section.

* * * * *

UNITED STATES PATENT OFFICE
CERTIFICATE OF CORRECTION

Patent No. 4,012,125                Dated   March 15, 1977

Inventor(s) Philip J. Hart

It is certified that error appears in the above-identified patent and that said Letters Patent are hereby corrected as shown below:

Column 2, line 10, " $r = \dfrac{D}{\left(\cos\dfrac{1+M}{2M}\theta\right) 2M/(1+M)}$ ," should read -- $r = \dfrac{D}{\left(\cos\dfrac{1+M}{2M}\theta\right)^{2M/(1+M)}}$, --;

Column 2, line 19, "plane,D" should read --plane; D--;

Column 4, line 52, "at point 10" should read --at point Q--;

Column 5, line 20, "surfaces" should read --surface--;

Column 6, line 11, "(or r θ plane)" should read --(or rθ) plane--;

Column 9, line 49, "hand 3-D" should read --hand, the 3-D--;

Column 12, line 1, "illustrated" should read --the illustrated--;

Column 12, line 33, "angle γ" should read --angle δ--;

Column 14, line 40, " $r = \dfrac{D}{\left(\cos\dfrac{1+M}{2M}\theta\right) 2M/(1+M)}$ ," should read -- $r = \dfrac{D}{\left(\cos\dfrac{1+M}{2M}\theta\right)^{2M/(1+M)}}$, --;

UNITED STATES PATENT OFFICE
CERTIFICATE OF CORRECTION

Patent No. 4,012,125　　　　　　　Dated March 15, 1977

Inventor(s) Philip J. Hart

It is certified that error appears in the above-identified patent and that said Letters Patent are hereby corrected as shown below:

Column 15, line 5, "$r = \dfrac{D}{\left(\cos\frac{1+M}{2M}\theta\right) 2M/(1+M)}$," should read -- $r = \dfrac{D}{\left(\cos\frac{1+M}{2M}\theta\right)^{2M/(1+M)}}$, --;

Column 16, line 17, "$\theta_c = m\delta/(1+M)$" should read

--$\theta_c = M\delta/(1+M)$--; and

Column 16, line 30, "angle view" should read --angle of view-- .

Signed and Sealed this twelfth Day of July 1977

[SEAL]

Attest:

RUTH C. MASON
Attesting Officer

C. MARSHALL DANN
Commissioner of Patents and Trademarks